(12) United States Patent
Speigle et al.

(10) Patent No.: US 8,055,063 B2
(45) Date of Patent: Nov. 8, 2011

(54) METHODS AND SYSTEMS FOR IMPROVING ROBUSTNESS OF COLOR BALANCE CORRECTION

(75) Inventors: Jon M. Speigle, Vancouver, WA (US); John E. Dolan, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 760 days.

(21) Appl. No.: 11/529,088

(22) Filed: Sep. 28, 2006

(65) Prior Publication Data

US 2007/0024634 A1    Feb. 1, 2007

Related U.S. Application Data

(63) Continuation-in-part of application No. 10/677,034, filed on Sep. 30, 2003, now Pat. No. 7,064,769, and a continuation-in-part of application No. 10/676,306, filed on Sep. 30, 2003, now Pat. No. 7,356,180.

(51) Int. Cl.
  *G06K 9/00* (2006.01)
(52) U.S. Cl. .......... 382/162; 382/167
(58) Field of Classification Search .......... 345/589; 358/500, 400, 1.1, 2.1, 509, 515, 516, 518, 358/520, 522; 382/162, 254, 232, 167, 241, 382/255, 270
See application file for complete search history.

(56) References Cited

U.S. PATENT DOCUMENTS

| 4,642,684 | A | 2/1987 | Alkofer |
| 4,648,051 | A | 3/1987 | Wandell |
| 4,992,963 | A | 2/1991 | Funt |
| 5,793,884 | A | 8/1998 | Farrell |
| 5,805,213 | A | 9/1998 | Spaulding |
| 5,825,916 | A | 10/1998 | Denber |
| 5,926,291 | A | 7/1999 | Haraguchi |
| 5,949,962 | A | 9/1999 | Suzuki |
| 6,038,339 | A * | 3/2000 | Hubel et al. .......... 382/162 |
| 6,038,399 | A | 3/2000 | Fisher |
| 6,243,133 | B1 | 6/2001 | Spaulding |
| 6,249,601 | B1 | 6/2001 | Kim |
| 6,505,002 | B2 | 1/2003 | Fields |
| 6,678,407 | B1 | 1/2004 | Tajima |
| 6,898,312 | B2 * | 5/2005 | Schroder .......... 382/167 |
| 6,947,079 | B2 | 9/2005 | Parulski |
| 7,180,629 | B1 | 2/2007 | Nishio et al. |
| 7,352,894 | B2 | 4/2008 | Dolan et al. |
| 7,376,271 | B2 * | 5/2008 | Lee et al. .......... 382/168 |
| 7,436,997 | B2 | 10/2008 | Ishigami et al. |
| 2003/0194127 | A1 * | 10/2003 | Hubel et al. .......... 382/165 |
| 2007/0043527 | A1 * | 2/2007 | Quan et al. .......... 702/104 |

FOREIGN PATENT DOCUMENTS

JP    04-074935    7/1990

(Continued)

OTHER PUBLICATIONS

Understanding Illuminants by Michael DiCosola. X-Rite Incorporated (Doc # CA00002a.doc). Aug. 25, 1995.*

(Continued)

*Primary Examiner* — Daniel Washburn
*Assistant Examiner* — Donna Ricks
(74) *Attorney, Agent, or Firm* — Chernoff Vilhauer McClung & Stenzel LLP

(57) ABSTRACT

Embodiments of the present invention comprise methods and systems for digital image color balance correction.

16 Claims, 12 Drawing Sheets

(12 of 12 Drawing Sheet(s) Filed in Color)

Example of proposed cumulative histogram confidence for an image that should be corrected and was correctly classified by the P(x) measure. (Image 20).

FOREIGN PATENT DOCUMENTS

| | | | |
|---|---|---|---|
| JP | 5120436 A | 5/1993 | |
| JP | 07050815 | 2/1995 | |
| JP | 143513 | 6/1995 | |
| JP | 2000-92509 | 3/2000 | |
| JP | 2000-133663 | 5/2000 | |
| JP | 2000148978 A | 5/2000 | |
| JP | 2000-171304 | 6/2000 | |
| JP | 3105679 | 9/2000 | |
| JP | 2001-527344 | 12/2001 | |
| JP | 2002-77937 | 3/2002 | |
| JP | 2003-23631 | 1/2003 | |
| JP | 2003143623 A | 5/2003 | |
| JP | 2003-259138 | 9/2003 | |
| JP | 2004192129 | 7/2004 | |
| JP | 4393962 | 10/2009 | |
| JP | 4421437 | 12/2009 | |
| JP | 4421438 | 12/2009 | |
| WO | WO9933261 | 7/1999 | |

OTHER PUBLICATIONS

C. Rosenberg, T. Minka and A. Ladsariya, "Bayesian Color Constance with Non-Gaussian Models," Proceedings of the NIPS, 2003.*

K. Barnard. Modeling Scene Illumination Colour for Computer Vision and Image Reproduction: A Survey of Computational Approaches. Technical Report, Simon Fraser University, Vancouver, B.C., Canada, 1998.*

V.C. Cardei et al., Estimating the Scene Illumination Chromaticity by Using a Neural Network, J. Opt. Soc. Am. A 19, 2374-2386 (2002).*

Office Action issued Apr. 6, 2010 in co-pending Japanese Patent Application No. 2004-351917; pp. 1-5.

English Translation of Office Action issued Apr. 6, 2010 in co-pending Japanese Patent Application No. 2004-351917; pp. 1-13.

Yanai, Haruo et al.; "Tahenryokaiseki Handobukku (Handbook of Multivariate Analysis)"; pub. Gendai-Sugakusha; Japan; Apr. 20, 1986; First Edition; pp. 279-282.

Asano, Choihiro and Eshima, Nobuoki; "Kihon Tahenryokaiseki (Basic Multivariate Analysis)"; pub. Japan Standard Associate; Japan; Aug. 26, 1996; First Edition; pp. 30-36.

English Abstract of Japanese Publication No. 2002-077937; Applicant—Casio Comput Co Ltd.; published Mar. 15, 2002; pp. 1-11.

U.S. Appl. No. 11/529,088—Japanese Office Action—Notice of Allowance dated Nov. 4, 2009.

* cited by examiner

Example correction without consistency confidence measure (P(x)).

Example correction without consistency confidence measure (P(x)) showing the posterior probability distribution labeled as "match surface" and estimated illuminant.

Thumbnails of image suite.

Optimal classification for image suite. Blue dots indicate images that should be color corrected; red squares, ones that should not be corrected.

Classification based on P(x) criteria, showing correctly classified images (blue dots and red squares) and misclassifications (green X's).

Example image of Figure 2 with correction vetoed by P(x). The "correction" at top right shows that the image has not been corrected. The illuminant estimate at the bottom right shows the unmodified illuminant estimate as a green dot and the final estimate as a black dot. The match surface (bottom left) is unchanged by this computation.

Example of proposed cumulative histogram confidence for an image that should be corrected and was correctly classified by the P(x) measure. (Image 20).

Example of proposed cumulative histogram confidence for an image that should not be corrected and was correctly classified by the P(x) measure. (Image 34).

Example of proposed cumulative histogram confidence for an image that should not be corrected and was incorrectly classified by the P(x) measure. (Image 32).

Classification based on cumulative histogram of confidence image. Correctly classified images are shown by blue dots and red squares. Green X's indicate false positives; magenta X's indicate false negatives.

Contour plot of 2-parameter optimization ROC surface.
ROC is the percentage of correct classifications.

Slice of optimization ROC surface at the optimal 20th percentile.

METHODS AND SYSTEMS FOR IMPROVING ROBUSTNESS OF COLOR BALANCE CORRECTION

CROSS-REFERENCE TO RELATED APPLICATIONS

This application is a continuation-in-part of application Ser. No. 10/677,034, filed Sep. 30, 2003 now U.S. Pat. No. 7,064,769, entitled "Systems and Methods for Computing the Presence of Self-Luminous Elements in an Image", invented by Jon Speigle; this application is also a continuation-in-part of application Ser. No. 10/676,306, filed Sep. 30, 2003 now U.S. Pat. No. 7,356,180, entitled "Systems and Methods for Correcting Image Color Balance", invented by Jon Speigle and John Dolan.

BACKGROUND OF THE INVENTION

Many factors affect the color of a digital image. Image color content can be attributed to shifts in the physical color content of a scene, shifts due to image processing errors, and shifts due to scene illuminant color. When color shifts cause an image to incorrectly represent the color of an image object, color correction can be used to ameliorate the bias in the image. However, color correction should be avoided when the color bias is attributed to the object of the image scene. Current color correction methods do not adequately discern between these color contributors. Accordingly, improper corrections are performed thereby decreasing the accuracy of the image.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION EXEMPLARY EMBODIMENTS OF THE PRESENT INVENTION

Figures 1A, 1B:
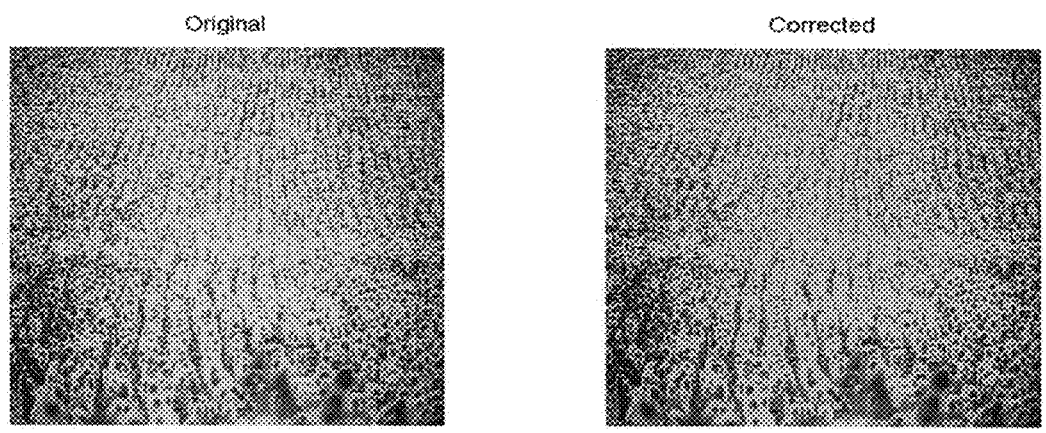
FIG. 1(a) is an image of a field of sunflowers.
FIG. 1(b) is a version of the image of FIG. 1(a) that has been improperly "corrected"

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention, but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Embodiments of the present invention comprise methods and systems for detecting and correcting colorbalance problems in digital images. These methods and systems can be applied to many different colorbalance correction methods and algorithms. Color correction algorithms typically address how to discriminate between shifts in the physical color content of the scene, shifts due to image processing errors, and shifts due to scene illuminant color. The methods and systems of embodiments of the present invention improve discrimination of images representing biased scene color content from images exhibiting an induced color bias that should be corrected.

When an image color bias is attributed to the scene object content, the proper solution is to avoid a standard color correction of the image. If a correction is applied in this circumstance, the corrected image will most likely be less preferred than the original image. One example of this situation where scene object content can "fool" some algorithms is an image of a field of brightly colored sunflowers. Many algorithms will detect the abundance of yellow as an indicator that the scene illuminant is yellow and correct the image color away from yellow.

One aspect of the systems and methods of embodiments of the present invention thus involves the decision stage as to whether or not to color correct an image. An aspect of some embodiments of the present invention is that they can be used to reduce or increase a bias in a color correction estimate due to the scene color content.

In some embodiments of the present invention the systems and methods may employ a probabilistic colorbalance correction algorithm. In these embodiments, a particular instance of a scene color model is established and an image is then evaluated to determine how representative the image is within this model. In some embodiments, this process is similar to detecting when a given image is a statistical outlier given the model. In other embodiments, a model can be generated that represents an unlikely scene color or illuminant (and that has a very different mathematical derivation), but that implicitly deals with detecting unlikely images that should not be corrected.

Probabilistic Illuminant Estimation

In some embodiments of the present invention, a probabilistic illuminant estimation method may be used. In some of these embodiments, a maximum a posteriori estimator (MAP) for the scene illuminant may be used. In some exemplary embodiments, this probabilistic estimation method may be described as follows. Let $p(e_j|X)$ represent the posterior probability of the jth illuminant given an image X and let $p(e_j)$ represent the prior probability of the jth illuminant. Bayes' formula allows one to compute the posterior probability given the priors and likelihood functions, $p(X|e_j)$.

$$p(e_j|X) = \frac{p(X|e_j)P(e_j)}{\sum_k^M p(X|e_k)P(e_k)}$$

The illuminant having the maximum posterior probability may then be selected as the scene illuminant estimate. In other embodiments, techniques may use the posterior mode, posterior mean, or may minimize an additional Bayes cost function. A maximum likelihood estimator may use the likelihood functions without prior weighting.

Making the assumption that pixels are independent in the image, the image likelihood function can be computed as the product of the likelihoods of all pixels in the image.

$$p(X|e_j) = \prod_i^N p(x_i|e_j)$$

In some embodiments, spatial dependencies between pixels (common in photographic images) may be accounted for by a more complicated image probability model (e.g., one using Markov random fields).

In some embodiments, each pixel may be described by a color vector containing the pixel chromaticity values. A number of different chromaticity spaces may be employed including CIE x and y chromaticities or RGB-based chromaticity spaces such as r=R/G, b=B/G; or r=R/(R+G+B), g=G/(R+G+B). The continuous probability distribution may be approximated by a discrete frequency distribution over a set of chromaticity bins.

A model of surface reflectance and illumination may be used to approximate the color frequency distributions. This model may associate color and/or intensity attributes of light reflected off a reflective test surface, which has known color and reflective properties, to the color and/or intensity attributes of light illuminating the test surface. One exemplary method of estimating this distribution is to generate a large number of random samples from a set of representative reflectance functions and then to render these reflectance functions, r(1), under an illuminant spectral power distribution, e(1). Sensor responses, $R_i$, can be computed by projecting onto the sensor sensitivity functions, S(1).

$$R_i = \sum_{\lambda=380}^{760} S(\lambda)e(\lambda)r(\lambda)$$

In some simulations, the 462 reflectances of the Munsell matte set were used as our set of possible reflectance functions.

A second exemplary method of estimating scene color distributions is to render a reflectance set under an illuminant and then to compute the histogram of color values. This method may equal the expected values of the chromaticity frequencies using the random sampling method for large samples. Normalizing the 2D chromaticity histogram yields a frequency distribution that can be used as $p(X|e_j)$.

The illuminant estimated by this second exemplary method can be used to compute a color correction matrix that approximates the mapping of the surface reflectance functions from the estimated illuminant to a canonical illuminant such as CIE D6500. Applying this color correction matrix to the image color values will ideally produce a more pleasing image.

Testing for Model Violations

One problem with the above method is that the estimated illuminant will be correct only if all of the assumptions of the model are valid. It has been determined that when the assumptions of the simple probability model are violated, the estimated illuminant is often inaccurate and can lead to erroneous colorbalance correction. Some embodiments of the present invention add model validity testing to the framework. These embodiments may determine the degree to which images violate the probability model and attenuate the correction in these cases. A correction attenuation method used in some embodiments of the present invention is described in U.S. patent application Ser. No. 10/676,306, entitled "Systems and Methods for Correcting Image Color Balance, invented by Jon M. Speigle and John E. Dolan, filed Sep. 30, 2003, hereby incorporated herein by reference.

FIGS. 1(a) and 1(b) are digital photographs of a field of sunflowers. FIG. 1(a) is the original image and FIG. 1(b) is an image that has been "corrected" using known methods. These images provide an example of the simple MAP estimation algorithm not performing well. For this image a yellowish illuminant is selected as the estimated illuminant, which results in a correction in the direction of the complementary hue. The "corrected image" takes on a noticeable shift in a bluish-greenish direction.

Figure 2A:
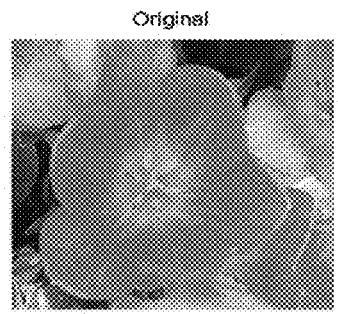
FIG. 2(a) is an image of a flower.
Figure 2B:
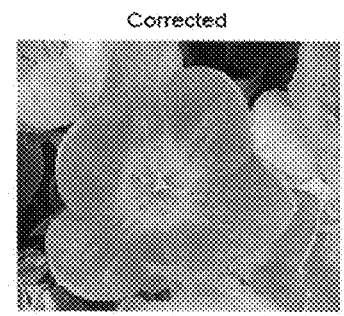
FIG. 2(b) is a version of the image in FIG. 2(a) that has been improperly "corrected"
Figure 2C:
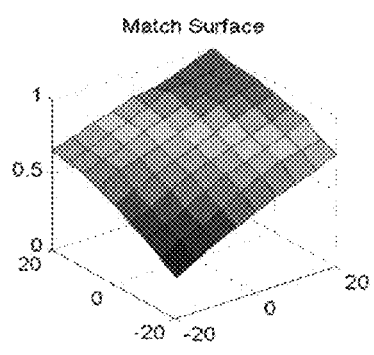
FIG. 2(c) is a 3-D graph showing a match surface.
Figure 2D:
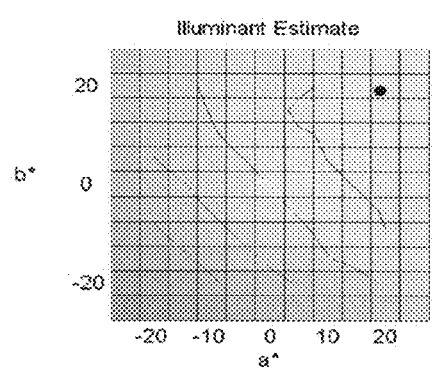
FIG. 2(d) is a diagram showing an illuminant estimate for the image shown in FIG. 2(a)

FIGS. 2(a) and 2(b) show another example of bright surface colors being mistaken for color induced by the illuminant. Again, FIG. 2(a) represents the original image and FIG. 2(b) represents the "corrected" image. In this case, a reddish illuminant is estimated, resulting in an inappropriate correction. FIG. 2(c) represents the posterior probability distribution or "match surface". In FIG. 2(c) the height above the a*b* (horizontal) plane represents the probabilities of illuminants given the image data. FIG. 2(d) depicts the estimated illuminant coordinates as a dot in the a*b* plane.

Embodiments of the present invention detect when an image violates the assumptions of an underlying color probability model. Two exemplary embodiments and their associated derivations of the image probability are described. These embodiments correspond to implementations of different computational complexities. These derivations differ as to when the assumption of pixel independence is introduced relative to the marginalization across illuminants.

Exemplary Probability Determination Embodiment 1: Marginalization Followed by Pixel Independence The following derivation culminates in the overall probability of the image, p(X). The overall image probability is equal to the joint probability, p(X,e), marginalized over all illuminants. The joint probability, p(X,e), represents the probability of jointly drawing a particular illuminant e and an image X. The marginal, p(X), represents the image probability across all illuminants. The subscript E on the integral denotes that the integration is over the space of all illuminants.

$$p(X) = \int_E p(X, e) de$$

By the definition of conditional probability $$p(X|e) = \frac{p(X, e)}{p(e)}$$

we can substitute for the joint probability.

$$p(X) = \int_E p(X|e) p(e) de$$

where p(X|e) is the probability of an image conditioned on the illuminant and p(e) is the prior probability of drawing a particular illuminant.

For a discrete set of M illuminants this becomes $$p(X) = \sum_i^M p(X|e_i) p(e_i)$$

If we assume that all illuminants are equally likely, then the image probability is simply the average of the conditional probabilities.

$$p(X) = \frac{1}{M} \sum_i^M p(X|e_i)$$

Now applying the pixel independence assumption, we can substitute for p(X|$e_j$). The overall image probability is now the average of the image probabilities conditional on each illuminant.

$$p(X) = \frac{1}{M} \sum_j^M \prod_i^N p(x_i|e_j)$$

This derivation of the overall image probability has numerical precision issues because the products of near zero probability values can drive the overall image probability to zero even though a majority of image pixels are highly probable. The second derivation avoids this problem.

Exemplary Probability Determination Embodiment 2: Pixel Independence Followed by Marginalization In this embodiment pixel independence is assumed at the outset. We compute the probability of each pixel marginalized across illuminants as follows, assuming, without loss of generality, that the illuminant prior is uniform.

$$p(x_i) = \frac{1}{M} \sum_j^M p(x_i|e_j)$$

This produces a probability map for the image where the value, [0,1], at each pixel indicates whether the pixel is unlikely (0) or likely (1) given our scene model. This probability map may be used in some embodiments, where a classification rule is based on the distribution of pixel color probabilities rather than the overall image color probability. Given the marginalized pixel color probability, p($x_i$), the pixel independence assumption can be applied to derive a simplified formula for the image color probability.

$$p(X) = p(x_1, x_2, \ldots, x_N) = \prod_i^N \frac{1}{M} \sum_j^M p(x_i|e_j)$$

For computational reasons, a form of the image probability formula may be derived that uses the image histogram. Because the image color distribution has already been computed, it is efficient to derive P(X) in terms of this histogram. The final result is to represent computing the image probability as the dot product between the image color distribution and the marginalized color probability function.

Computing the log image probability, $$\log p(X) = \log \prod_i^N \frac{1}{M} \sum_j^M p(x_i|e_j)$$

$$\log p(X) = \sum_i^N \log \frac{1}{M} \sum_j^M p(x_i|e_j)$$

$$\log p(X) = \sum_i^N \left[ \log\left(\sum_j^M p(x_i|e_j)\right) - \log M \right]$$

$$\log p(X) = -N \log M + \sum_i^N \log\left(\sum_j^M p(x_i|e_j)\right)$$

Substituting f(xi), $$\log p(X) = C_0 + \sum_i^N f(x_i)$$

where $$f(x_i) = \log\left(\sum_j^M p(x_i|e_j)\right)$$

$$C_0 = -N \log M$$

Now let $\bar{g}$ represent the image color histogram as a vector of color frequencies in the image for P bins:

$$\bar{g} = [N_1 N_2 \ldots N_P]$$

Because all pixels in the image are contained in the histogram, $\bar{g}$, $$N = \sum_{j}^{P} N_j$$

The summation of f(xi) over pixels can be approximated using the image color histogram.

$$\sum_{i}^{N} f(x_i) \approx \sum_{j}^{P} N_j f(b_j)$$

where $b_j$ represents the color coordinates of the bin. Note the approximation is due to the quantization error for each pixel, $e(x_i, b_j)$.

$$e(x_i, b_j) = f(x_i) - f(b_j)$$

Defining the vector $\bar{f}$ as a vector of f(x) evaluated at the bin centers:

$$\bar{f} = [f(b_1) f(b_2) \ldots f(b_P)]$$

the log image probability can be computed as the inner product between $\bar{f}$ and $\bar{g}$.

$$\log P(X) \approx <\bar{f}, \bar{g}> + C_0$$

Figure 3:
FIG. 3 shows a group of thumbnail images representing a test suite of images.
Figure 4:
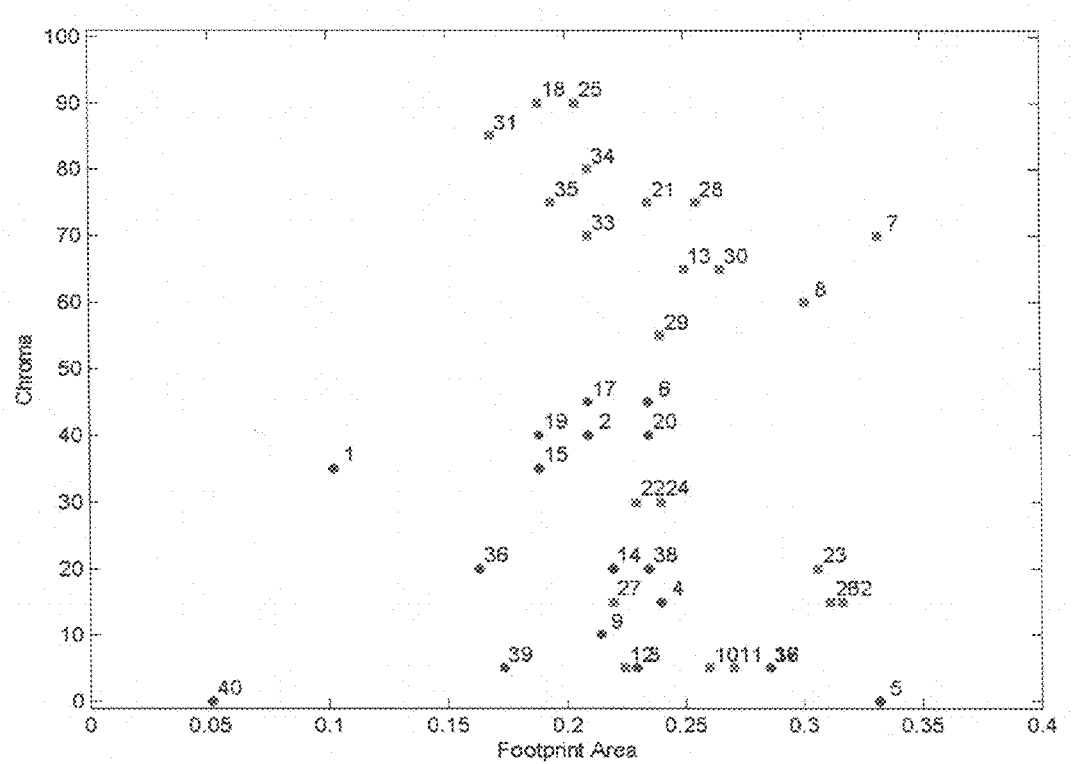
FIG. 4 is a graph showing an optimal classification for the test images shown in FIG. 3.

To illustrate the behavior of this algorithm we can use a test suite of images such as that shown in FIG. 3. FIG. 4 is a summarization of the images by the mode of the pixel chroma values (CIE chroma=sqrt ($a^{*2}+b^{*2}$)) and by the percentage of bins occupied by the image for a 2D chromaticity histogram (CIE x and y chromaticity for bin centers at x=[0.025 to 0.672 in steps of 0.05] and y with the same values). We refer to the occupied bin percentage as the image footprint area. In FIG. 4, squares indicate images that should not be corrected and circular dots indicate images that should be corrected.

How well different algorithms fare at classifying this image set is a consideration. An algorithm that applied a correction to all images in FIG. 3 would correspond to a percent correct of 0.45 (18/40). (Note that this classification percent correct is only one possible measure of algorithm performance. The actual magnitude and selected correction are also highly important. Although an algorithm may apply a correction, the actual final correction may be small in magnitude and therefore not objectionable. The classification percent correct assumes that the correction will be strongly biased by the image content and therefore objectionable.

Exemplary Classification Embodiment 1: Classification Based on Image Likelihood

The algorithm of this first embodiment uses the overall image probability to control whether an image is corrected. High image probabilities, P(X) indicate that the image is consistent with the set of illuminants and scene probability model indicating that correction is appropriate or a higher degree of correction is appropriate. Low P(X) images are not consistent with the scene model and will not be corrected or will be corrected to a lesser degree.

Figure 5:
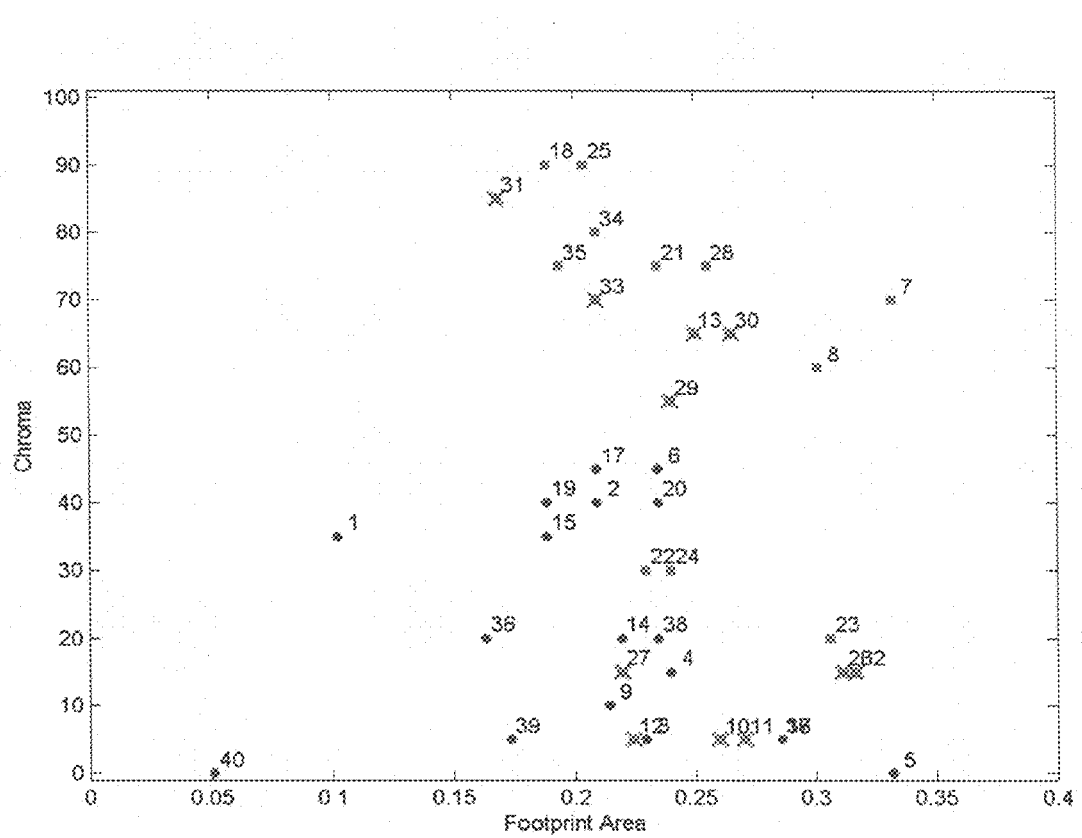
FIG. 5 is a graph showing a classification realized by an embodiment of the present invention for the test images shown in FIG. 3.

FIG. 5 is a graph showing the performance of a simple threshold on P(X). X's indicate false positives, that is where an image was corrected that should not have been. The percent correct for this algorithm is 0.73 (29/40).

In these embodiments, a hard threshold may be used to control correction. The magnitude of correction may be made a function of the image likelihood or other fixed and variable thresholding techniques may be used. Some methods for attenuating the magnitude of correction based on a confidence measure may also be used. Some of these methods are described in U.S. patent application Ser. No. 10/676,306, entitled "Systems and Methods for Correcting Image Color Balance, invented by Jon M. Speigle and John E. Dolan, filed Sep. 30, 2003, incorporated herein by reference.

Figure 6A:
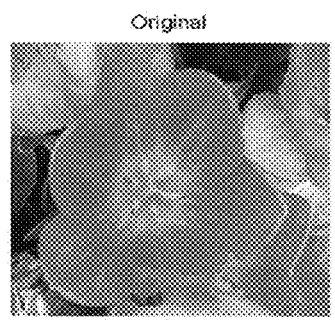
FIG. 6(a) is an image of a flower as shown in FIG. 2(a)
Figure 6B:
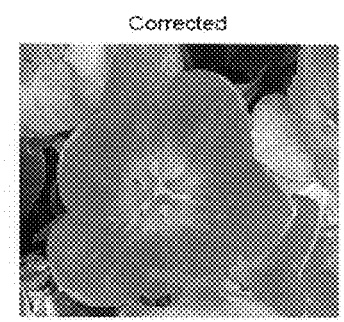
FIG. 6(b) is a version of the image in FIG. 6(a) wherein "correction" has been omitted according to embodiments of the present invention.
Figure 6C:
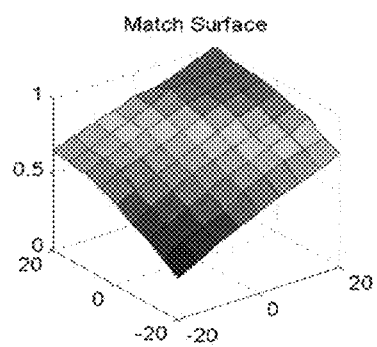
FIG. 6(c) is a 3-D graph showing a match surface for the image of FIG. 6(a)
Figure 6D:
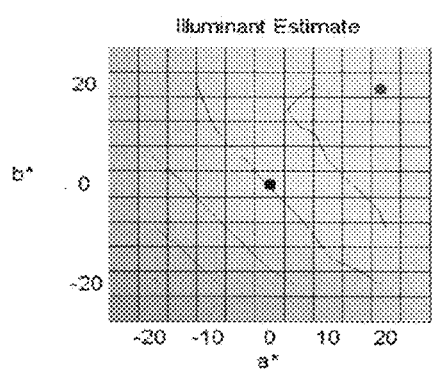
FIG. 6(d) is a diagram showing an unmodified illuminant estimate and a final illuminant estimate for the image shown in FIG. 6(a)

FIG. 6 shows the result of employing a hard definite threshold on P(X) for the image of FIG. 2(a) also shown at FIG. 6(a). The so-called "corrected" image shown in FIG. 6(b) is left untouched, because the threshold is not satisfied. FIG. 6(d) shows the unmodified illuminant estimate 62 (square) and the vetoed estimate 64 (dot). FIG. 6(c) shows the match surface, which is unchanged by this computation (compare to FIG. 2(c).

Figure 7A:
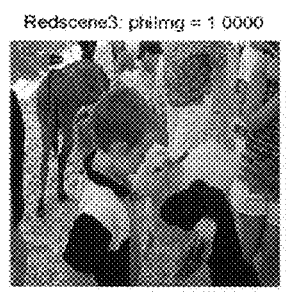
FIG. 7(a) is an image of a scene in a red tent.
Figure 7B:
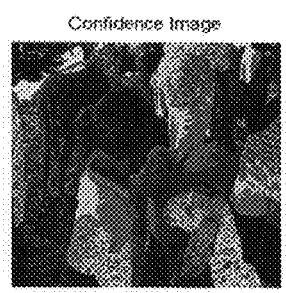
FIG. 7(b) is a grayscale image of p(xi) for the image shown in FIG. 7(a)
Figure 7C:
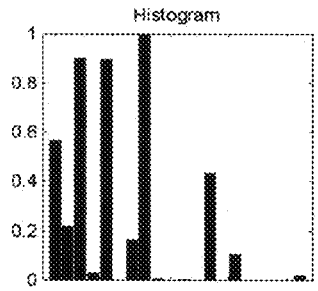
FIG. 7(c) shows a histogram of pixel probabilities for the image of FIG. 7(a)
Figure 7D:
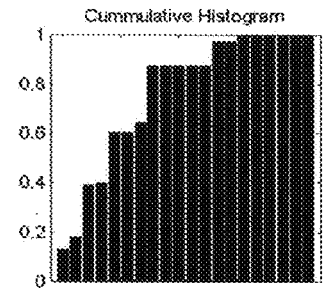
FIG. 7(d) shows a cumulative histogram of pixel probabilities for the image of FIG. 7(a)
Figure 8A:
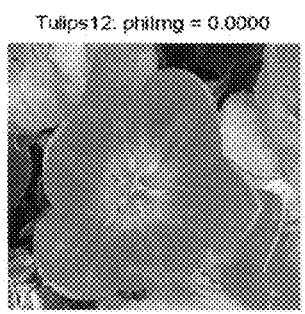
FIG. 8(a) is an image of a reddish flower.
Figure 8B:
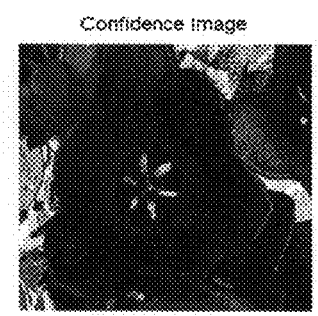
FIG. 8(b) is a greyscale image of p(xi) for the image shown in FIG. 8(a)
Figure 8C:
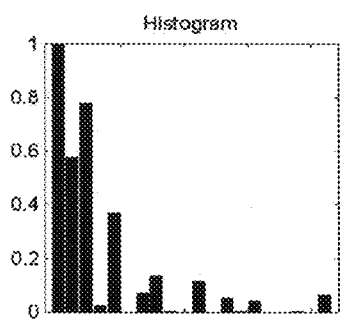
FIG. 8(c) shows a histogram of pixel probabilities for the image of FIG. 8(a)
Figure 8D:
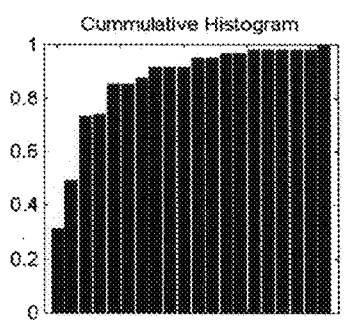
FIG. 8(d) shows a cumulative histogram of pixel probabilities for the image of FIG. 8(a)
Figure 9A:
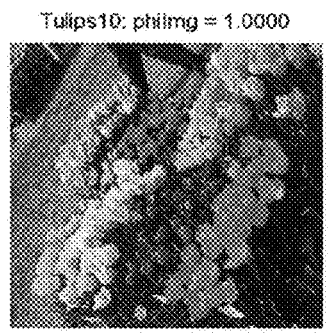
FIG. 9(a) is an image of a variety of flowers.
Figure 9B:
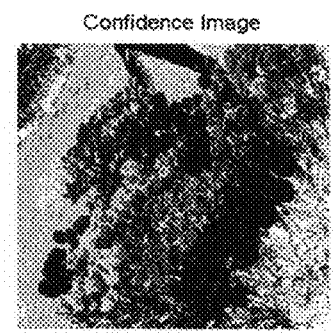
FIG. 9(b) is a greyscale image of p(xi) for the image shown in FIG. 9(a)
Figure 9C:
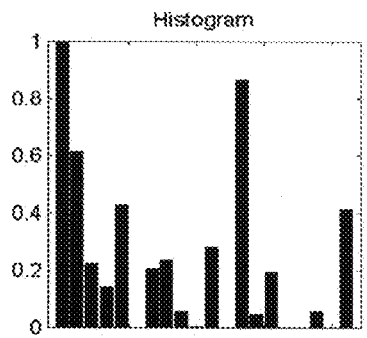
FIG. 9(c) shows a histogram of pixel probabilities for the image of FIG. 9(a)
Figure 9D:
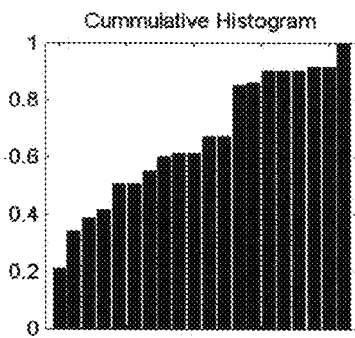
FIG. 9(d) shows a cumulative histogram of pixel probabilities for the image of FIG. 9(a)

Exemplary Classification Embodiment 2: Classification Based on Distribution of Pixel Likelihoods In some embodiments of the present invention, the distribution of pixel probabilities may be used rather than combining these to form an overall image probability. FIGS. 7-9 illustrate the pixel probabilities for three images. These three sets of figures are arranged with an original image shown in the upper left as FIGS. 7A, 8A and 9A and a grayscale image of $p(x_i)$ is shown in the upper right as FIGS. 7B, 8B and 9B. The grayscale images at (b), the image of $p(x_i)$, may be referred to as the "confidence images". White regions in the confidence images indicate pixels that were very likely given our scene model and black regions indicate unlikely pixels. The lower left panel of each image, at FIGS. 7C, 8C and 9C, shows a histogram of the pixel probabilities. The lower right panel, at FIGS. 7D, 8D and 9D, shows the cumulative of this distribution.

FIGS. 7A to 7D show an image and related data in a situation where correction was advantageously applied. FIGS. 8A to 8D show an image and related data in a situation where correction was omitted as inappropriate. FIGS. 9A to 9D show an image and related data in a situation where correction should have been omitted, but was applied nonetheless due to incorrect classification.

Figure 10:
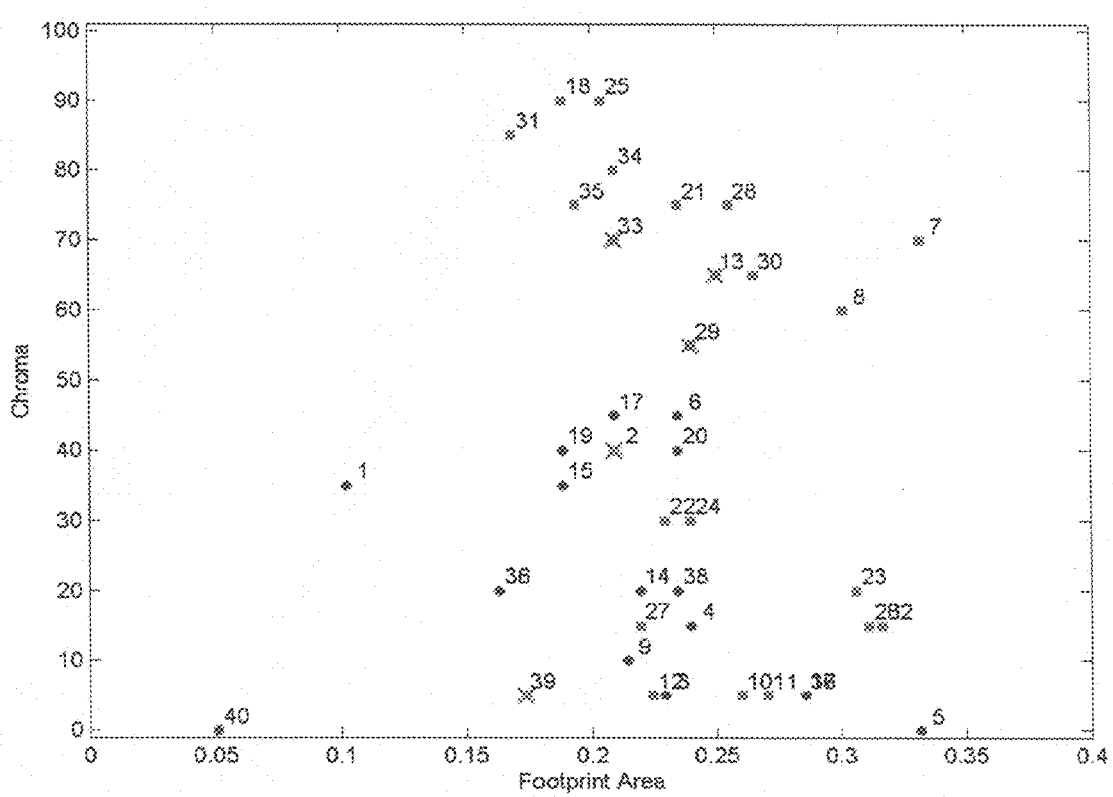
FIG. 10 is a graph showing a classification based on a cumulative histogram of a confidence image.

FIG. 10 is a graph showing image classifications based upon a measure derived from the cumulative confidence histograms of each image shown in FIG. 3. Correct matches are indicated by dots, such as exemplary dot 102 (images that should be corrected) and squares, such as exemplary square 104 (images that should not be corrected). X's 106 indicate false positives (images marked for correction that shouldn't be); the diamonds 108 indicate false negatives (images marked for no correction that should be corrected). The percentage correct or rate of classification (ROC) using this discrimination function is 0.875 (35/40).

The classification algorithm of these embodiments is based on evaluating the cumulative probability distribution of confidence values and is controlled by two parameters. An equivalent rule can be formulated in terms of the inverse cumulative distribution.

Let f(x) represent the frequency distribution of pixel confidences and c(a) represent the cumulative distribution for the interval $0 \leq x \leq a$.

$$c(a) = \int_0^a f(x) dx$$

The classification rule is:

if $c(a_o) < t_{proportion}$,
  do not correct
else
  correct

This rule basically evaluates the shape of the cumulative distribution for each image. The parameter $a_0$ represents a particular pixel confidence and $c(a_0)$ represents the cumulative frequency at this confidence. The cumulative threshold parameter $t_{proportion}$ represents an area under the probability distribution, $f(x)$.

Figure 11:
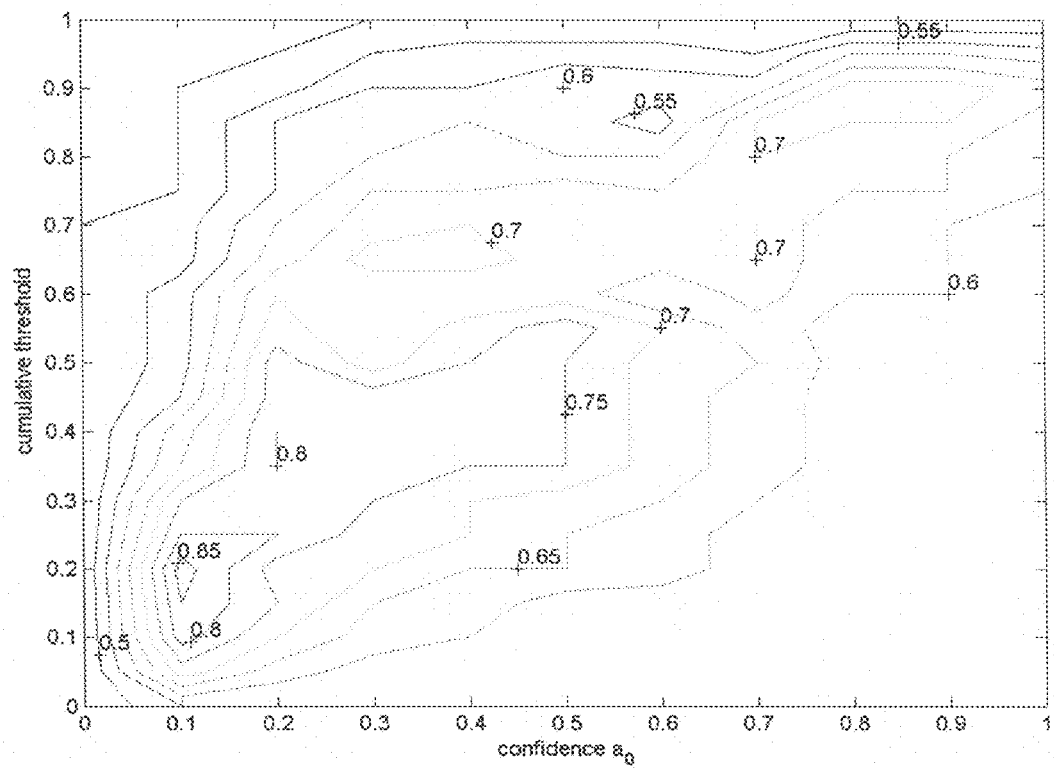
FIG. 11 is a contour plot of a 2-parameter optimization ROC surface.
Figure 12:
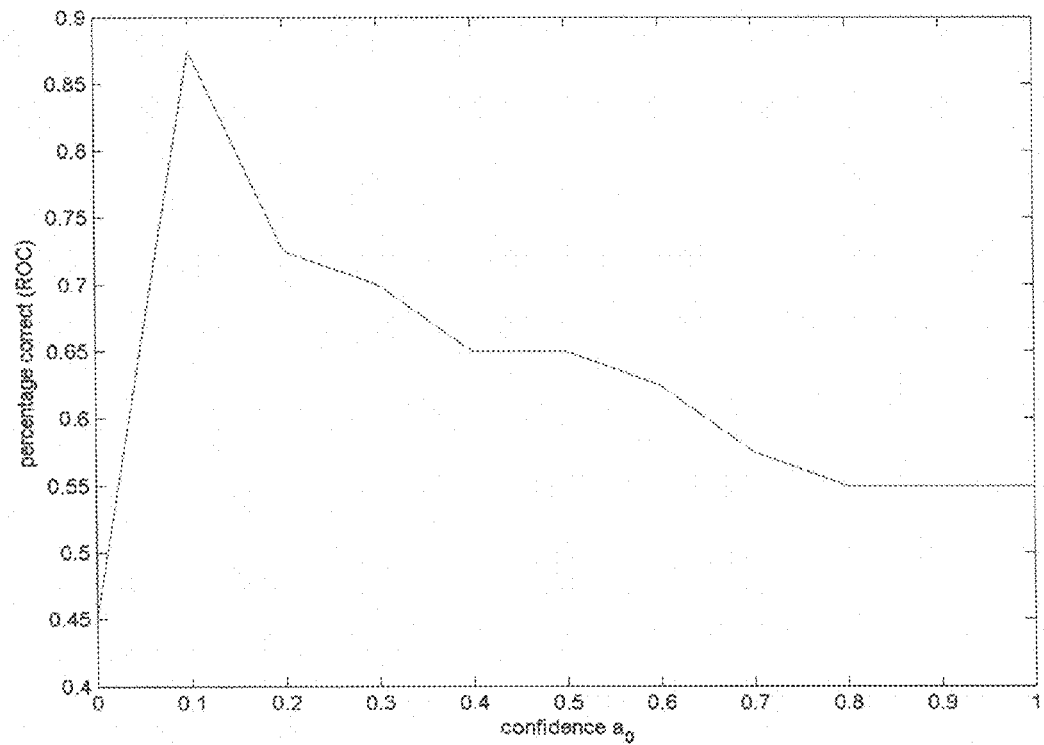
FIG. 12 is a graph showing a slice through the optimization surface of FIG. 11.

The methods of these embodiments may be optimized by maximizing the percentage correct for the two parameters $a_0$ and $t_{proportion}$ for an image set. FIG. 11 shows the percentage correct as a function of these two parameters. Contours in this figure represent curves of iso-percent correct. The maximum value of 0.875 occurred for a value of a0=0.1 and $t_{proportion}$=0.2. A slice through this surface at the optimal cumulative threshold 0.2 is shown in FIG. 12.

Exemplary Classification Embodiment 3: Pixel Likelihood Weighting in Illuminant Estimation The pixel probability can be used as a criteria for weighting pixels in the actual illuminant estimation process. Weighting pixels can reduce the influence that unlikely pixels (and regions of unlikely pixels) have on the final estimate. The correction may still be applied to the entire image, but is now a better estimate of the actual scene illuminant, which is the illuminant that actually illuminated the scene at the moment the image was captured. Methods and systems of some of these embodiments are described in U.S. patent application Ser. No. 10/677,034, entitled "Systems and Methods for Computing the Presence of Self-Luminous Elements in an Image, invented by Jon M. Speigle and John E. Dolan, filed Sep. 30, 2003, hereby incorporated herein by reference.

Alternative Scene Probability Model Embodiments

As described in the derivation of the pixel and image probability models, a number of alternative probability models may be formulated. The use of pixel/image probabilities in most embodiments is somewhat independent of the particular probability model.

In some embodiments the assumption of a uniform illuminant prior may be dropped and the actual illuminant priors that help produce better image classifications and corrections may be used. One simple illuminant prior that may be used is based on the distance from the locus of blackbody radiators or daylight locus. Both of these loci shift from bluish to yellowish and can approximate the illumination in outdoor scenes. Given a scene classification (e.g., indoor vs. outdoor), different illuminant prior probability functions could be used to further improve estimation accuracy.

In still other embodiments, methods of developing a color probability model may use a derivation of the probability model from a given image population. The simple reflectance-set approach does not reflect the actual color probabilities as seen in the world (e.g., that many outdoor photos will contain plants and plants are often greenish). An image-based method can be made to reflect the actual color probabilities in the world. An image-based approach may result in better image classification than the simple reflectance set approach for images representative of the particular image population.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. An image color adjustment method, said method comprising:
   a) obtaining pixel color data for a plurality of pixels;
   b) estimating an estimated illuminant based on said color data, wherein said estimated illuminant is determined by:
      i) generating a plurality of samples from a plurality of respective reflectance functions;
      ii) rendering said samples under an illuminant spectral power distribution;
      iii) computing a histogram of color values, from said rendered samples, and;
      iv) normalizing said histogram to yield a frequency distribution;
   c) computing a color correction matrix based on said frequency distribution, said matrix approximating the mapping of a surface reflectance function from said estimated illuminant to a canonical illuminant, wherein said computing is performed by a computing device comprising a processor and memory;
   d) determining a likelihood that said estimated illuminant is an actual illuminant, which illuminated said plurality of pixels at the time of their creation;
   e) adjusting the color of said plurality of pixels when said likelihood satisfies a conditional parameter, wherein said adjusting is performed by an adjustment device comprising a processor, and where said conditional parameter reflects an attribute of a cumulative probability distribution of confidence values that respective pixels were illuminated by said estimated illuminant, based on the expression $$t_p > \int_0^a f(x)\,dx$$

where $t_p$ is said conditional parameter, $f(x)$ is a probability distribution, and where a and $t_p$ are empirically-determined values;
   f) attenuating said adjusting the color of said plurality of pixels when said likelihood does not satisfy said conditional parameter, wherein said attenuating is performed by said adjustment device comprising a processor.

2. An image color adjustment method as described in claim 1 wherein said likelihood is computed using a model of spatial color distributions within an image.

3. An image color adjustment method as described in claim 1 wherein said likelihood is determined using a continuous probability distribution approximated by a discrete frequency distribution over at least one chromaticity bin.

4. An image color adjustment method as described in claim 3 wherein said discrete frequency distribution is approximated by a model of surface reflectance and illumination.

5. An image color adjustment method as described in claim 1 wherein said likelihood is an image probability equal to the joint probability marginalized over all illuminants.

6. An image color adjustment method as described in claim 1 wherein said likelihood is determined by computing the probability of each pixel marginalized across illuminants thereby producing a probability map wherein each value, corresponding to each pixel, indicates whether the pixel is unlikely or likely.

7. An image color adjustment method as described in claim 1 wherein said conditional parameter is the overall image probability and said adjusting takes place when said probability reaches a definite threshold.

8. An image color adjustment method as described in claim 1 wherein said conditional parameter is the overall image probability and said adjusting takes place when said probability reaches a variable threshold.

9. An image color adjustment method as described in claim 1 wherein said conditional parameter is a distribution of pixel probabilities and said adjusting takes place when said probability reaches a definite threshold.

10. An image color adjustment method as described in claim 1 wherein said conditional parameter is a distribution of pixel probabilities and said adjusting takes place when said probability reaches a variable threshold.

11. An image color adjustment method as described in claim 1 wherein said conditional parameter is a cumulative probability distribution of confidence values.

12. An image color adjustment method, said method comprising:
   a) obtaining pixel color data for a plurality of pixels;
   b) estimating an estimated illuminant based on said color data;
   c) computing a color correction matrix, said matrix approximating the mapping of a surface reflectance function from said estimated illuminant to a canonical illuminant, wherein said computing is performed by a computing device comprising a processor and memory;
   d) determining a likelihood that said estimated illuminant is an actual illuminant, which illuminated said plurality of pixels at the time of their creation, where said likelihood is determined by computing the image probability as a dot product between an image color distribution and a marginalized color probability function based on $$p(X) = \prod_i^N \frac{1}{M} \sum_j^M p(x_i \mid e_j)$$

where $p(X)$ is the image probability, $x_i$ is the $i^{th}$ pixel value, $e_j$ is the $j^{th}$ illuminant, N is the number of pixels, M is the number of considered illuminants;
   e) adjusting the color of said plurality of pixels when said likelihood satisfies a conditional parameter, wherein said adjusting is performed by an adjustment device comprising a processor; and
   f) attenuating said adjusting the color of said plurality of pixels when said likelihood does not satisfy said conditional parameter, wherein said attenuating is performed by said adjustment device comprising a processor.

13. An image color adjustment method as described in claim 12 wherein said estimating is performed using a probabilistic illuminant estimation method.

14. An image color adjustment method as described in claim 13 wherein said probabilistic illumination method comprises a maximum a posteriori mode function.

15. An image color adjustment method as described in claim 13 wherein said probabilistic illumination method comprises an a posterior mode function.

16. An image color adjustment method as described in claim 13 wherein said probabilistic illumination method comprises a minimization of a Bayesian cost function.

* * * * *

UNITED STATES PATENT AND TRADEMARK OFFICE
CERTIFICATE OF CORRECTION

| | | |
|---|---|---|
| PATENT NO. | : 8,055,063 B2 | Page 1 of 1 |
| APPLICATION NO. | : 11/529088 | |
| DATED | : November 8, 2011 | |
| INVENTOR(S) | : Jon M. Speigle | |

It is certified that error appears in the above-identified patent and that said Letters Patent is hereby corrected as shown below:

Col. 7, Line 29

Change " $\log P(X) \approx < \vec{f}, \vec{g} > + C_0$ " to read: -- $\log P(X) \approx (\vec{f}, \vec{g}) + C_0$ --.

Signed and Sealed this
Twentieth Day of March, 2012

David J. Kappos
*Director of the United States Patent and Trademark Office*